No. 608,216. Patented Aug. 2, 1898.
D. OGDEN.
BATTERY ZINC.
(Application filed Apr. 12, 1897.)
(No Model.)
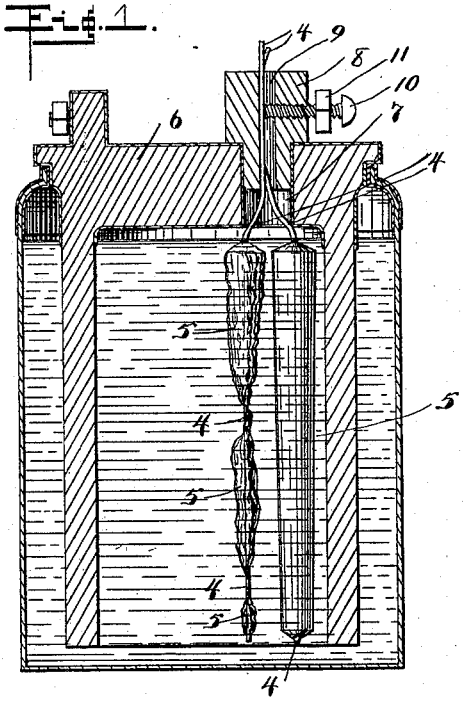
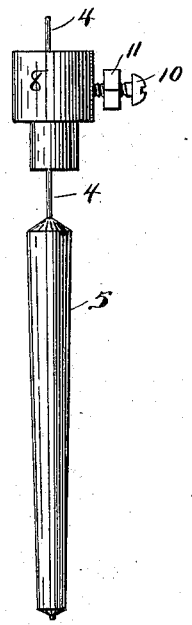
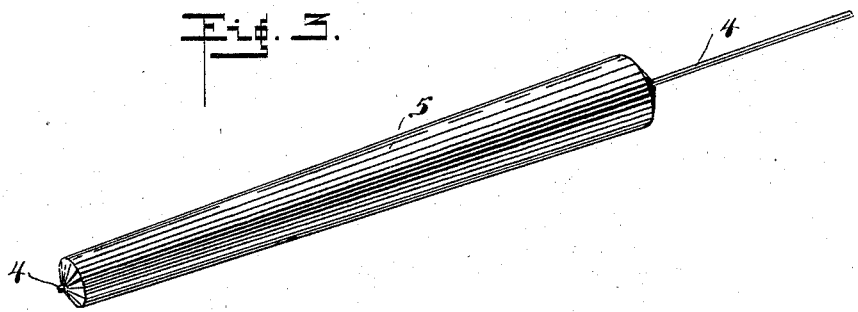
Witnesses
Samuel Ashby
Emma Kaminsky
Inventor
Dora Ogden.
By Attorneys
H. P. Hood & Son
THE NORRIS PETERS CO., PHOTO-LITHO., WASHINGTON, D. C.

UNITED STATES PATENT OFFICE.

DORA OGDEN, OF COLUMBUS, INDIANA.

BATTERY-ZINC.

SPECIFICATION forming part of Letters Patent No. 608,216, dated August 2, 1898.

Application filed April 12, 1897. Serial No. 631,675. (No model.)

*To all whom it may concern:*

Be it known that I, DORA OGDEN, a citizen of the United States, residing at Columbus, in the county of Bartholomew and State of Indiana, have invented a new and useful Battery-Zinc, of which the following is a specification.

My invention relates to an improvement in zincs or other electrodes for batteries.

The object of my invention is to produce a zinc or other electrode to be dissolved in which the arrangement shall be such that every particle of said electrode may be dissolved while still suspended within the cell.

A further object is to provide means whereby one or more of such electrodes may be suspended within the same cell.

The accompanying drawings illustrate my invention.

Figure 1 is a central vertical section of an ordinary Leclanché cell provided with my improved zinc and fastening means therefor. Fig. 2 is a side elevation of one of the zincs secured in position in the fastening means. Fig. 3 is a perspective view of the improved zinc.

It is to be understood that the term "zinc" wherever used in this application is intended to mean any battery-electrode which is dissolved by the action of the battery.

In the drawings, 4 indicates a conductor-stem, preferably in the form of a flexible wire composed of aluminium, copper, or other conducting material not dissolved by the action of the battery. Cast upon one end of stem 4 is the electrode 5, composed of zinc or other desirable material, the arrangement being such that the stem is intimately connected with the electrode throughout the greater portion of its length, so that in case the electrode should be eaten through at a point between its ends the lower end thereof would still be suspended and held in position by the stem.

For the purpose of suspending the electrode in the cell any desired means may be employed, or the said electrode may be allowed to rest upon the bottom of the cell, as was customary in the old form of cells. At the present time many batteries, however, are provided with a cover 6, in some cases the said cover being formed integral with the carbon electrode. Cover 6 is provided with an opening 7, through which the zinc may be introduced, and within this opening I mount a plug 8, provided with an opening 9, which is sufficiently large to receive two or more of the stems 4. Plug 8 is provided with a binding-screw 10, adapted to engage all of the stems 4, which may be inserted in opening 9, and thus hold said stems within the plug. Mounted upon screw 10 in the usual manner is a nut 11, by means of which connection may be made with the circuit.

In operation a single zinc is secured to plug 8 and mounted within the cell. When this zinc has become sufficiently dissolved to effect the strength of the battery, the plug and zinc are together removed from the cell and a bend is formed in stem 4 between the plug and the zinc. A fresh electrode is then introduced into the cell and a similar bend formed in its stem 4. The new conductor is then inserted in opening 9 and secured therein by the binding-screw. It will of course be understood that the bending of the stems 4 is not absolutely essential, but by this means each zinc may be caused to hang vertically in the cell.

As the dissolution of the zinc progresses it often occurs that it will be entirely eaten through at a point between its ends, and the lower end thereof drops to the bottom of the cell and is entirely wasted. In the present construction, the stem 4 being intimately connected with the zinc throughout its entire length, no such action can occur, for each part of the zinc is held in position thereby, so that there is absolutely no waste.

It will of course be understood that any desired number of stems may be inserted into opening 9 of the plug 8.

I claim as my invention—

1. The combination of a battery-cell having a cover provided with an opening therethrough for the introduction of one of the electrodes, two or more electrodes with stems, a plug mounted in the cover and having an opening receiving the two or more stems, and means for securing said stems within said opening whereby the said electrodes may be suspended in the cell.

2. The combination of a battery-cell having a cover provided with an opening therethrough for the introduction of the electrodes, two or more electrodes with stems, and means for securing said stems within said opening whereby the said electrodes may be suspended within the cell.

DORA OGDEN.

Witnesses:
JOE M. WRIGHT,
CHAS. PARISHO.